United States Patent
Scolari et al.

(10) Patent No.: US 9,334,015 B2
(45) Date of Patent: May 10, 2016

(54) LINE DERAILLEUR

(71) Applicant: Zike, LLC, Greenville, SC (US)

(72) Inventors: Nathan A. Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 122 days.

(21) Appl. No.: 14/203,949

(22) Filed: Mar. 11, 2014

(65) Prior Publication Data

US 2014/0265219 A1    Sep. 18, 2014

Related U.S. Application Data

(60) Provisional application No. 61/788,024, filed on Mar. 15, 2013.

(51) Int. Cl.
| | | |
|---|---|---|
| *B62M 9/12* | (2006.01) | |
| *B62M 1/26* | (2013.01) | |
| *B62M 9/14* | (2006.01) | |
| *B62K 3/00* | (2006.01) | |

(52) U.S. Cl.
CPC ............ *B62M 9/12* (2013.01); *B62K 3/002* (2013.01); *B62M 1/26* (2013.01); *B62M 9/14* (2013.01)

(58) Field of Classification Search
CPC .......... B62M 9/12; B62M 9/16; B62M 9/124; B62M 9/125; B62M 9/126
USPC ............................................. 474/80; 280/261
See application file for complete search history.

(56) References Cited

U.S. PATENT DOCUMENTS

| | | |
|---|---|---|
| 540,977 A | 11/1894 | Grove |
| 3,535,950 A | 10/1970 | Ishida et al. |
| 3,901,095 A * | 8/1975 | Wechsler ............. B62M 9/1244 280/238 |
| 3,965,763 A * | 6/1976 | Wechsler ............. B62M 9/1246 116/28.1 |
| 4,023,424 A * | 5/1977 | Ryan ...................... B62M 9/124 280/238 |
| 4,286,953 A | 9/1981 | Shimano |
| 4,410,198 A | 10/1983 | Fernandez |
| 5,125,288 A | 6/1992 | Amiet |
| 5,152,720 A | 10/1992 | Browning |
| 5,213,549 A * | 5/1993 | Blanchard ................ B62M 9/16 474/81 |
| 5,672,133 A | 9/1997 | Eden |
| 5,865,062 A | 2/1999 | Lahat |

(Continued)

FOREIGN PATENT DOCUMENTS

| | | |
|---|---|---|
| FR | 20090224506 | 9/2009 |
| GB | 566311 | 12/1944 |

OTHER PUBLICATIONS

International Search Report and Written Opinion of the International Searching Authority for PCT/US2014/026256.

*Primary Examiner* — Kevin Hurley
*Assistant Examiner* — Daniel Yeagley
(74) *Attorney, Agent, or Firm* — Douglas W. Kim; McNair Law Firm, P.A.

(57) ABSTRACT

The present invention is directed to a derailleur that can include: a base plate disposed between a perimeter of a drive sprocket nest and a pedal sprocket; a chain guide attached to said base plate for moving a chain laterally causing said chain to move from sprocket to sprocket in a sprocket nest; a chain guide surface included in said chain guide for causing said chain to contact over ½ a perimeter of said pedal sprocket decreasing the likelihood of the chain slipping off said sprocket; and, a tension member attached to said base plate for removing slack in a chain as the chain moves from a larger sprocket to a smaller sprocket.

19 Claims, 9 Drawing Sheets

(56) References Cited

U.S. PATENT DOCUMENTS

| | | |
|---|---|---|
| 6,572,500 B2 | 6/2003 | Tetsuka |
| 1,568,591 A1 | 8/2005 | Adachi |
| 7,326,137 B2 | 2/2008 | Van Der Linde |
| 7,905,805 B2 * | 3/2011 | Hara .................. B62M 9/16 474/115 |
| 8,128,111 B2 | 3/2012 | Scolari |
| 2006/0058134 A1 | 3/2006 | Mercat et al. |
| 2006/0270499 A1 | 11/2006 | Kilshaw |
| 2012/0088618 A1 * | 4/2012 | Scolari .................. B62K 3/002 474/135 |

* cited by examiner

LINE DERAILLEUR

FIELD OF THE INVENTION

This application relates to a speed changing device for rider propelled vehicles using a chain drive and a sprocket nest with a plurality of different sized sprockets. The sprocket changing device is a derailleur system in line with sprocket nests including a chain slack take-up mechanism.

BACKGROUND OF THE INVENTION

A rider propelled vehicle is generally understood to be typically a two wheeled vehicle with a front free rolling, steerable wheel and a rear free rolling, non-steerable wheel, connected to each other by a frame including a rider platform positioned between the wheels on which the rider can support himself. To move, the rider can actuate pedal to provide rotational force on the rear wheel producing locomotion. This locomotion process has been employed for bicycles for quite some time as shown in U.S. Pat. No. 540,977 issued on Jun. 11, 1895.

The limitation to the initial bicycle design was that the pedals were connected to the drive wheel either directly or by a chain. However, this connection was typically a single gear connection. Attempting to improve the efficiency of the connection includes the advent of the sprocket nest and derailleur system as shown in U.S. Pat. No. 3,535,950 issued on Oct. 27, 1970. In the reference, the derailleur is disposed at or near the rear sprocket nest.

The derailleur system currently used in bicycles has been engineered to allow the chain to smoothly move to an adjacent sprocket within the sprocket nest at selected locations around each sprocket. Each sprocket is modified to provide clearance for chain shifting with a small plurality of reduced sized chain pickup teeth with modified shape at selected locations on the sprocket, but with adjacent normally sized teeth providing adequate chain grip and strength around the rest of the sprocket's outer periphery or circumference.

The chain travel is directed by a movement of the derailleur guiding the chain from the sprocket it is on and feeding the chain onto an adjacent larger sprocket when decreasing the speed or a smaller sprocket when increasing the speed.

The bicycle derailleur devices are physically mounted on the frame of the bicycle and its movement is generally operated by a guide wire or cable extending from a shifting lever attached on the handle bar to the derailleur. When the rider selects a new sprocket, he moves the lever moving the wire or cable which in turn repositions the derailleur to effect a sprocket change. The derailleur is a sophisticated device that has a fixed structure attached to the frame or rear axle and a movable structure that is held in position by at least one double pivot with multiple heavy duty springs that allow the movable elements to rotate or move in the path of a parallelogram created by two opposing plates hinged to move parallel relative to the other. This movement enables the chain guide portion of the derailleur to move relative to the sprocket nest in a relatively uniform path in relation to the guide and the sprockets while minimizing twisting the chain.

In order to function properly, the chain slack that exists when the chain is on the sprocket must be taken up. The amount of chain slack is reduced as the chain moves to larger sprockets. In bicycles, the derailleur chain guide system is positioned to extend well below the axle and frame. This enables the chain to serpentine through the low hanging derailleur guide system by having the chain extend well below the largest of the sprockets. Due to this limitation, derailleurs are not available for vehicle such as scooters which include much smaller wheels and tire and therefore have insufficient clearance for the typical derailleur.

Recently, a new generation of scooters and bicycles has been developed with reciprocating foot pedals such as U.S. Pat. No. 8,128,111. These vehicles, particularly the scooters, have frames that have a very low center of gravity to make the vehicles more stable. The frames are so low to the ground that the prior art derailleurs conventionally positioned below the rear sprocket nest are virtually useless. Nevertheless, these vehicles need a shifting device to allow the rider to selectively change speeds. Further, positioning the derailleur adjacent to the rear sprocket nest is not advantageous for such a vehicle as a scooter. It would be preferred to have a derailleur that is disposed between the front and rear sprocket nests.

Further, the typical derailleur can only actuate one sprocket nest at a time. As such, for a vehicle such as a bicycle with a sprocket nest at the rear wheel and a sprocket nest at the pedal assembly, two derailleurs are required. Dual derailleurs are simply too bulky and complicated for today's' scooter. Further, placing the derailleur adjacent to the rear wheel requires that the pedal of a scooter such as shown in U.S. Pat. No. 8,128,111 be too high over the rear wheel axle or spaced too far apart to accommodate the traditional derailleur.

Further, the typical derailleur and drive assembly causes the chain to contact the sprocket only on about one half of the sprocket as shown in U.S. Pat. No. 6,572,500. As can be seen, the chain contacts the rear sprocket on about half of the teeth of the rear sprocket and only about half of the teeth of the front sprocket. This limits the diameters differential between sprockets in increasing size on the sprocket nest. If the differential is too large, the chain tends to skip or to even fall off the sprocket nest.

Therefore, it is the object of the present invention to provide for a derailleur that can be used with a low profile vehicle such as a scooter.

It is another object of the present invention to provide a derailleur that is disposed between a front and rear sprocket nest.

It is another object of the present invention to provide a derailleur that can be used to change sprockets for both the front and rear sprocket nest with the need for a dual derailleur system.

It is another object of the present invention to provide a derailleur that increases the contact surface between the chain and the sprockets of a sprocket nest.

SUMMARY OF THE INVENTION

The above objectives are accomplished by providing a self-powered non-motorized vehicle having a frame, a steerable front wheel carried by the frame, and a rear wheel carried by the frame. The rear wheel linked to the drive axle, comprising: a drive sprocket nest attached to the rear wheel so that when rotational force is applied to the drive sprocket nest the rear wheel rotates causing locomotion; a pedal sprocket carried by the frame and linked to the drive sprocket nest by a chain so that when a rotational force is applied to the pedal sprocket, the pedal sprocket rotates causing the drive sprocket nest to rotate; a derailleur carried by the frame and positioned forward the drive sprocket nest and rearward of the pedal sprocket; and, a chain guide that when the derailleur is moved laterally relative to a long axis of the frame, the chain moves between sprockets on the drive sprocket nest.

The chain guide can include a chain guide surface which causes the chain to contact over ½ a perimeter of a sprocket of the drive sprocket nest when the chain is engaged with the sprocket. A tension member can be carried by the frame causing the chain to contact over ½ the perimeter of the pedal sprocket decreasing the likelihood of the chain slipping off the pedal sprocket. The derailleur can be disposed in a shifting area. The shifting area can be defined by a line vertically intersecting the axis of the drive sprocket nest, a line connecting generally the top perimeter of the pedal sprocket and the largest sprocket of the drive sprocket nest, a line vertically intersecting the pedal sprocket and a line connecting generally the bottom perimeter of the pedal sprocket and the largest sprocket of the drive sprocket nest. In one embodiment, the shifting area can be defined by a line vertically intersecting a point on the perimeter of the largest sprocket of the drive sprocket at the most forward point of the drive sprocket nest, a line connecting generally the top perimeter of the pedal sprocket and the largest sprocket of the drive sprocket nest, a line vertically intersecting the pedal sprocket and a line connecting generally the bottom perimeter of the pedal sprocket and the largest sprocket of the drive sprocket nest.

The derailleur can include a base plate included in the derailleur wherein the base plate has a first slot and a second slot wherein the second slot is generally a "Z" configuration; and, a first pin received in the first slot for guiding the base plate along a path and a second pin received in the second slot for guiding the base plate along the path. The first slot can be generally a "Z" configuration. In one embodiment, the first slot and the second slot are offset about 45 degrees.

The derailleur can be disposed forward of the perimeter of the largest sprocket of the drive sprocket nest and rearward of the pedal sprocket perimeter. There can be a pedal sprocket and a sprocket in a nest carried by the frame so that when the derailleur moves in a lateral direction in relation to a long axis of the frame, the chain moves from one sprocket to another of the pedal sprocket nest.

DESCRIPTION OF THE DRAWINGS

The invention will be better understood with reference to the following drawings that are part of this specification.

DESCRIPTION OF THE INVENTION

Figure 1A:
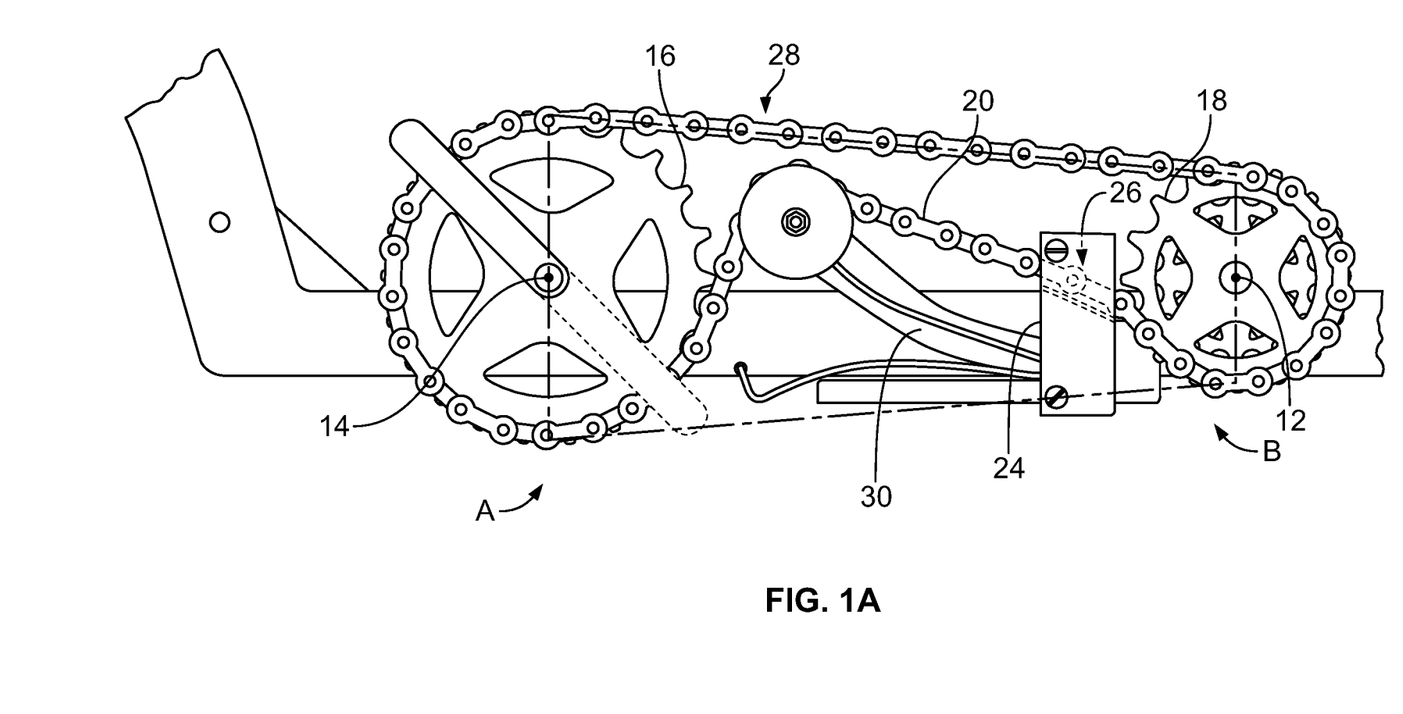
FIG. 1A is a side view of the invention placed on a pedal scooter.
Figure 1B:
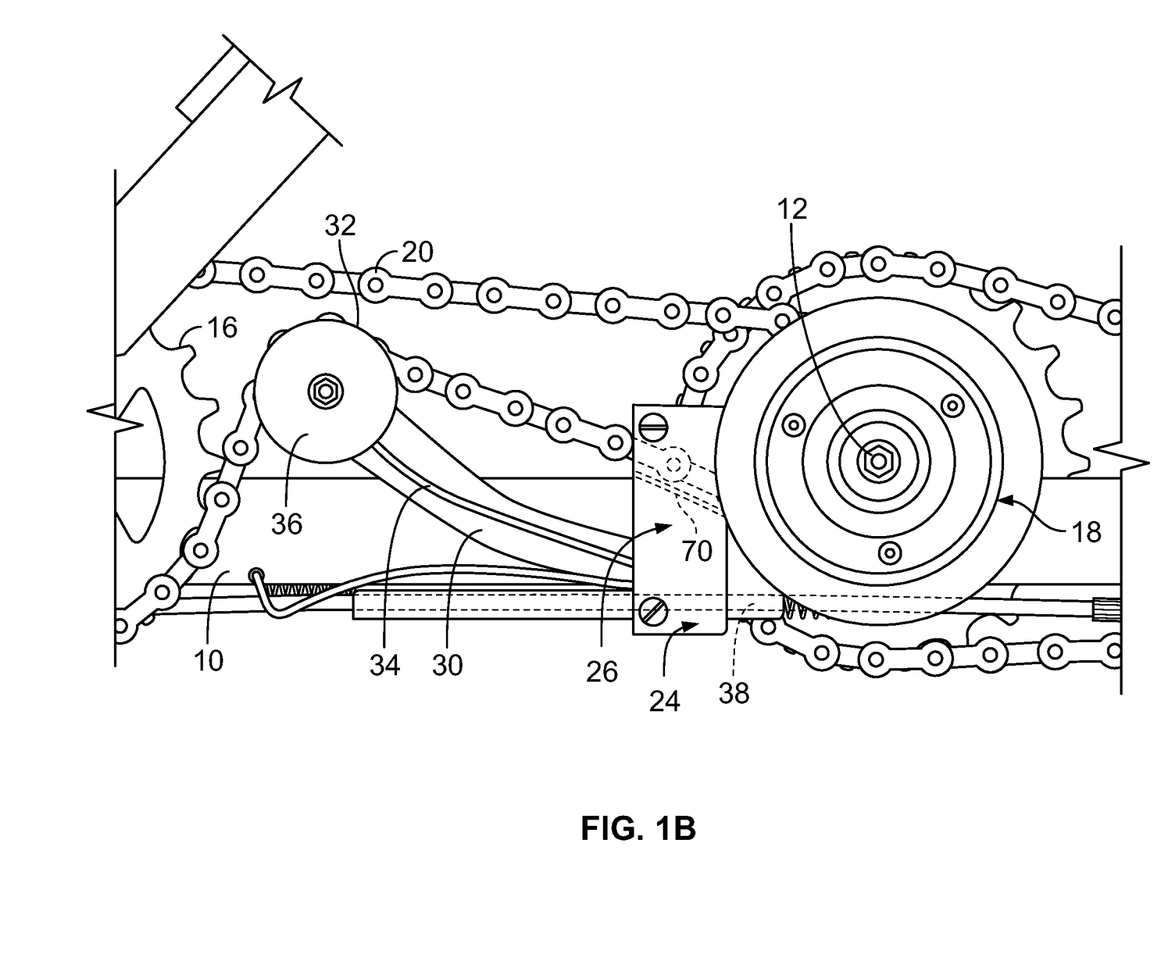
FIG. 1B is a side view of the invention placed on a pedal scooter.

Referring to FIGS. 1A and 1B, frame 10 includes a drive axle 12 and a pedal axle 14. A pedal sprocket 16 is rotatably attached to the frame. A drive sprocket nest 18 is rotatably attached to the frame rearward of the pedal sprocket and includes a plurality of sprockets. A chain 20 engages the pedal sprocket and drive sprocket nest so that when rotational force is applied to the pedal sprocket, the rear drive sprocket nest is rotated. A rear wheel 22 is attached to the drive sprocket nest by a drive linkage so that when the pedal sprocket is rotated; the drive sprocket is rotated thereby rotating the rear wheel providing locomotion. The pedal sprocket nest is disposed generally at location A along the frame and the drive sprocket nest is disposed generally at location B along the frame.

A derailleur 24 located in the shifting area 28 includes a chain guide 26 attached to the frame and at least partially receives the chain to cause the chain to be moved laterally in relation to the long axis of the frame. When the chain guide causes the chain to move laterally, the chain will move from one sprocket in the drive sprocket nest to the adjacent sprocket causing the drive system to change gears. The chain guide, in one embodiment, can include a idler or other surface to support the chain upwards.

The shifting area is defined by: (a) a line intersecting generally the top of the pedal sprocket and the top of the largest sprocket in the drive sprocket nest, (b) a vertical line generally orthogonal to the axis of the frame intersecting the drive sprocket nest; (c) a line intersecting generally the bottom of the largest sprocket in the drive sprocket nest and generally the bottom perimeter of the pedal sprocket; and (d) a vertical line generally orthogonal to the axis of the frame intersecting the pedal sprocket. By having the derailleur disposed in the shifting area, the derailleur does not require the clearance of the typical derailleur.

A tension member 30 is shown attached to the frame and includes an idler 32 and a spring 34 which biases the idler upwards placing tension on the chain. The tensioning member can be attached to the derailleur or the frame. A tension member guard 36 can be included to prevent the rider from being entangled in the chain and tension member idler. A drive sprocket guard 38 can be included to prevent the rider from being entangled in the drive sprocket nest and chain.

The pedal sprocket 16 is shown. Idler is shown biasing the chain upwards and causing the chain to contact the pedal sprocket on more than ½ of its perimeter. Because the chain contacts more than ½ of the perimeter of the pedal sprocket when there is a pedal sprocket nest, the diameter between sprockets can be increased over traditional increments. In one embodiment, the differential between pedal diameters from one pedal sprocket to another is increased by thirty percent over traditional sprocket nests.

Figure 2:
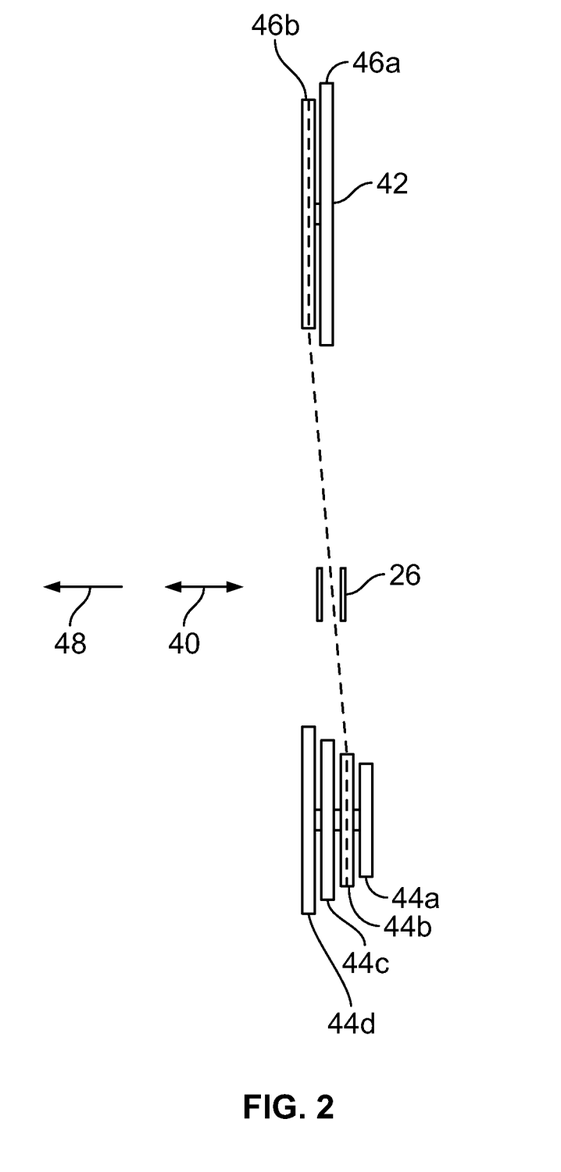
FIG. 2 is a top view of the frame showing the pedal sprocket nest, derailleur and drive sprocket nest.

Referring to FIG. 2, the chain guide 26 moves in a lateral direction 40 thereby causing the chain to move from sprocket to sprocket on the drive sprocket nest. In one embodiment, a pedal sprocket nest 42 is included in place of the single pedal sprocket allowing for more gears. In this configuration, the chain guide causes the chain to move among sprockets on both the drive sprocket nest and the pedal sprocket nest. In operation, the chain can be initially positioned around the drive sprocket 44a and pedal sprocket 46a. As the chain guide moves in a direction shown as 48, the chain moves from sprocket 44a to sprocket 44b. As the chain guide continues to move in direction 48, the chain moves from drive sprocket 44c to drive sprocket 44d. Once the chain has traveled to the last sprocket in this series, the movement of the chain causes the chain to move from pedal sprocket 46a to sprocket 46b. When the chain guide moves in a direction opposite 48, the chain would then move from drive sprocket 44d, to 44c, to 44b and then to 44a. If the chain is on drive sprocket 44a and the chain guide moves in a direction opposition 48, the chain will move to pedal sprocket 46a from 46b. Therefore, the chain is moved among the pedal sprocket nest and the drive sprocket nest with one chain guide and therefore one derailleur.

Referring to FIG. 3A through 3D, the derailleur base plate 50 is attached to the chain guide 26. The chain guide can include guide arms 27a and 27b and side walls 26a and 26b for exerting force on the chain to move the chain laterally in relation to a long axis of the frame. A first slot 54b is defined in the forward portion of the base plate and a second slot 54a is defined in a rearward portion of the base plate. A first pin 56 is received in the first slot and a second pin 58 is received in the second slot. When the cable 60 is tensioned in a direction shown as 62, the base plate also moves in a direction 62, however, pin 58 and slot 54 force the rear portion of the base plate to move in a direction shown as 64. Direction 64 includes two components to its movement, vector 64a and 64b. The vector 64b moves the chain guide in direction 64b and therefore causes the chain[s] to move from one drive sprocket to another. When tension is released from the cable, springs such as forward spring 68a and rear spring 68b cause the base plate to move in a direction opposite 62 thereby causing the chain guide to move in a direction opposite 64 causing the chain guide to move the chain from one drive sprocket to another.

Figure 4:
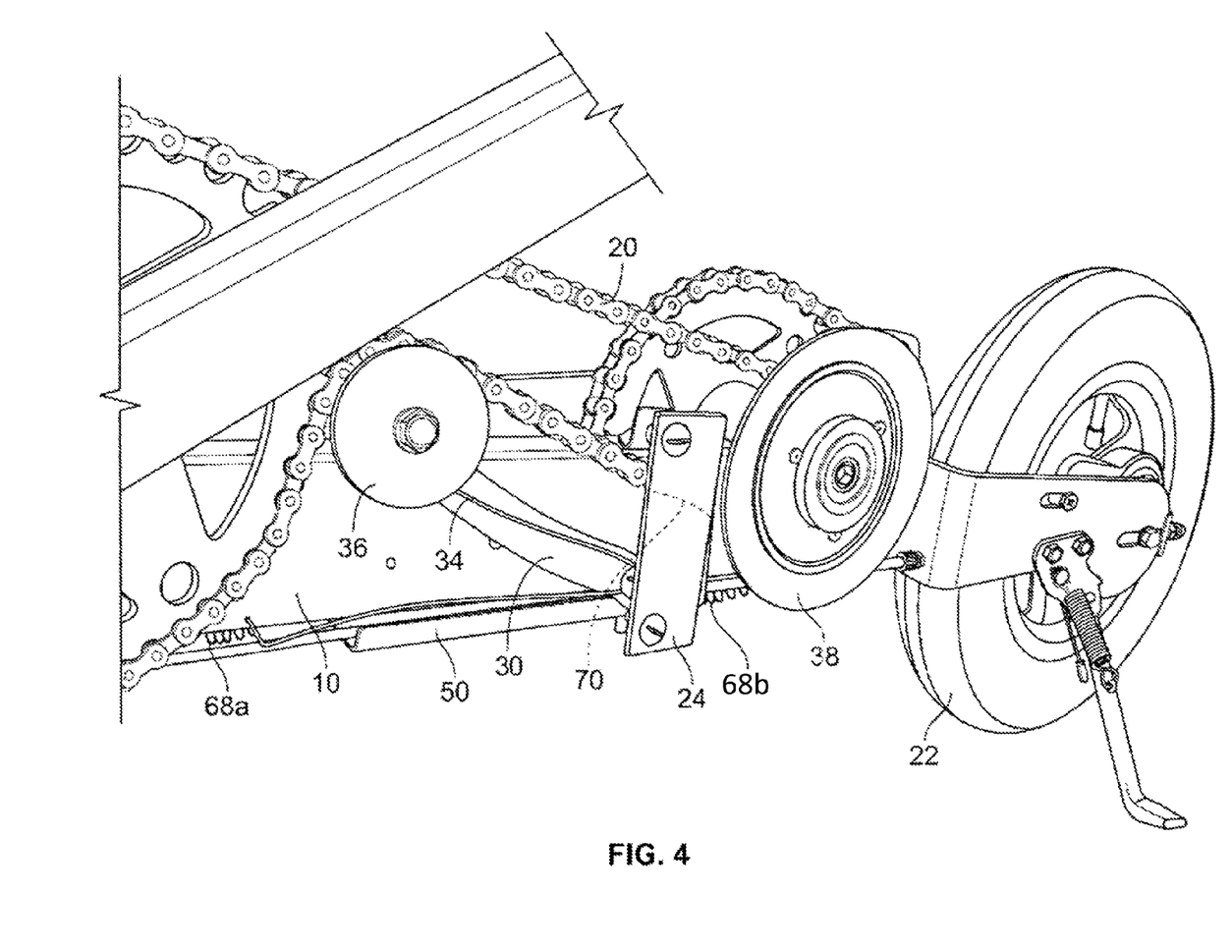
FIG. 4 is a perspective view of the invention.

In another embodiment is showing the use of one derailleur to move a chain about a pedal sprocket nest and drive sprocket nest. A forward chain guide 70 is attached to the base plate for causing the chain to move from one pedal sprocket to another pedal sprocket. The forward chain guide can include an inside plate 70a and an outside plate 70b. The plates of the chain guide can include forward ramps 71a and 71b to prevent the chain from catching the chain guide In one embodiment, the plates are curved. The first slot 54a resembles a "Z" shape with the ends angled relative to the long axis of the frame. The second slot 54b also resembles a "z" shape with the ends generally parallel to the long axis of the frame. The first slot can cause a portion of the base plate to travel along a first path and the second slot can cause a portion of the base plate to travel along a second path. When the base plate is in the inner most position as shown in FIG. 4A, the pin is at the front of the first slot and the front of the second slot. Referring to FIG. 4B, when the base plate is moved in a direction shown as 62, the front portion of the base plate moves in a direction shown as 64b, a first path in one embodiment. This causes the chain to also move in the pedal sprocket nest in direction 64b which causes the chain to move to another sprocket in the pedal sprocket nest. The rear pin simply travels in a path parallel to the long axis of the frame and does not cause the chain to move to another sprocket in the drive sprocket nest, a second path in one embodiment.

Figure 3A:
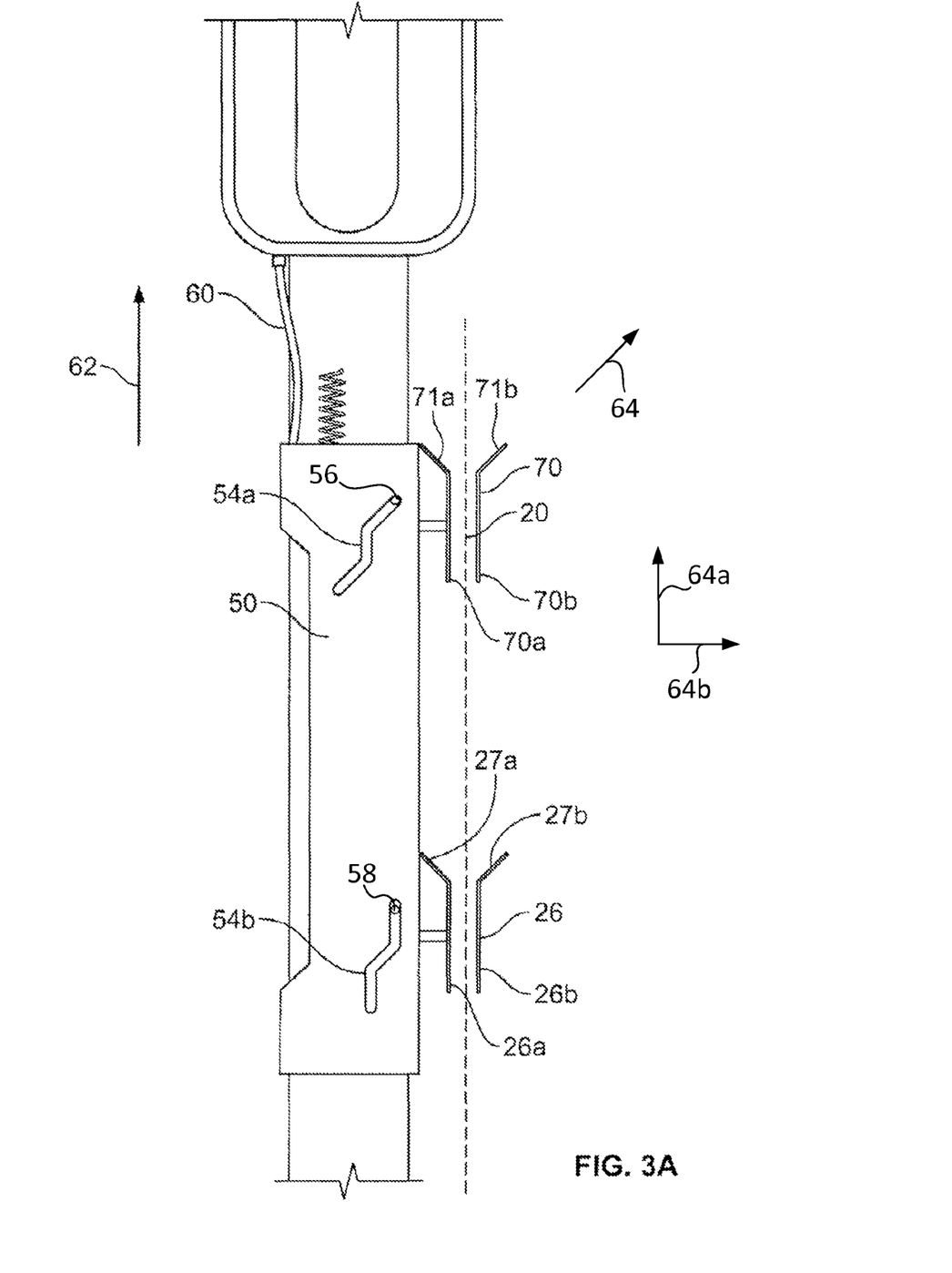
FIGS. 3A through 3D are bottom views of the invention in various orientations.
Figure 3B:
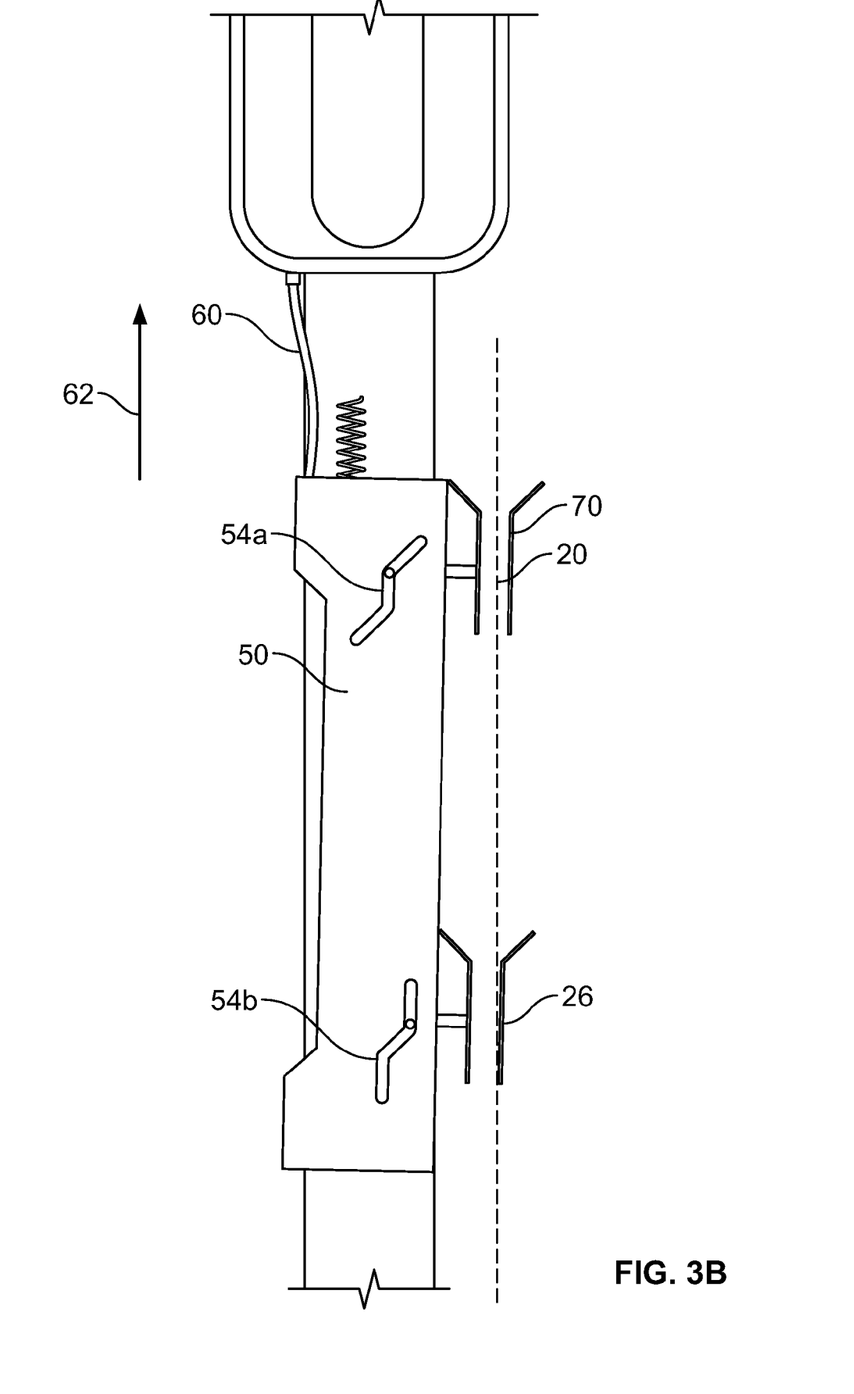
Figure 3C:
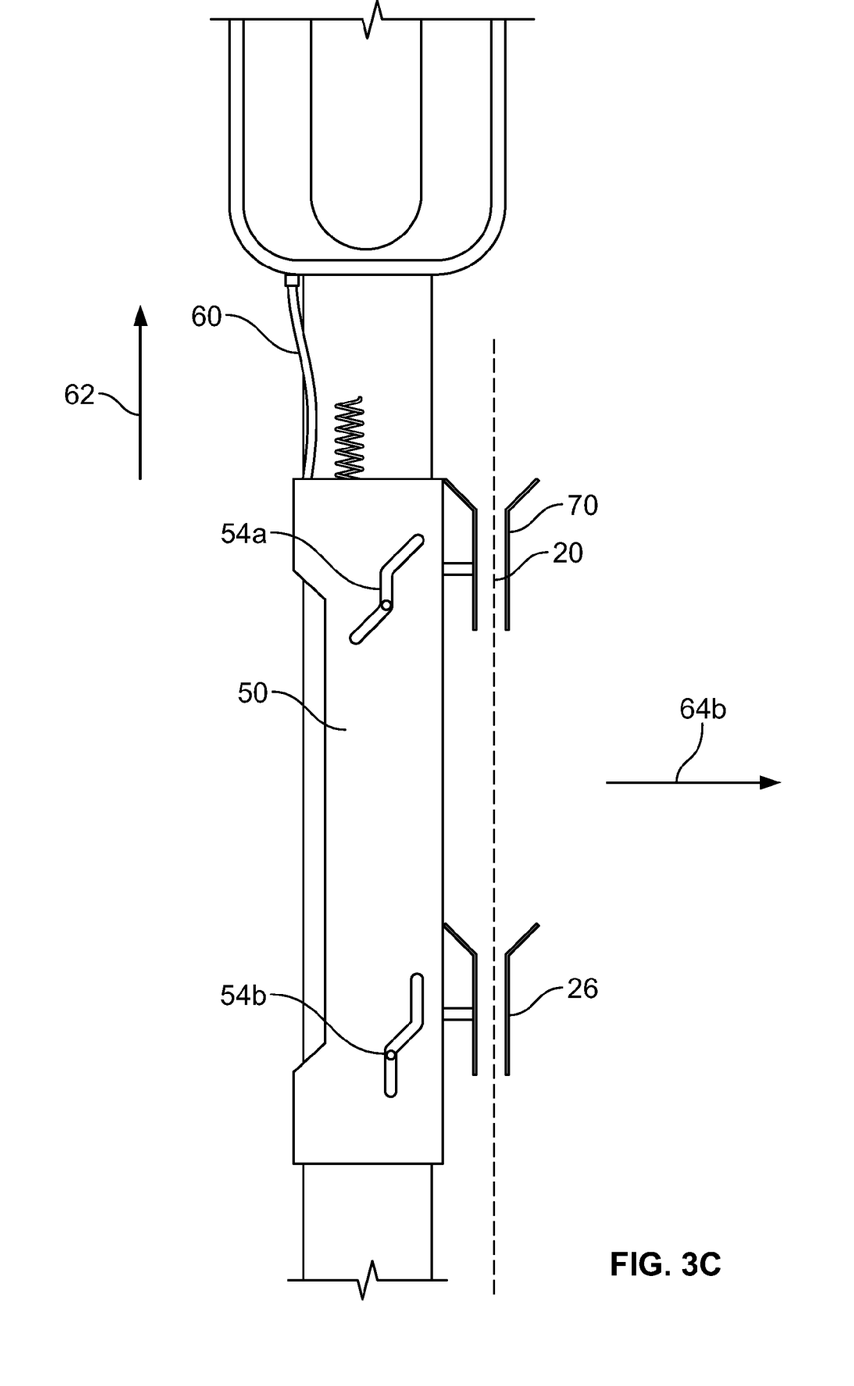

Referring to FIG. 3C, the base plate is further moved in direction 62. This causes the rear portion of the base plate to move in a direction 64b causing the chain to move to another sprocket in the drive sprocket nest. As the front of the base plate simply travels in a path parallel to the long axis of the frame, the chain does not move to a different sprocket in the pedal sprocket nest.

Figure 3D:
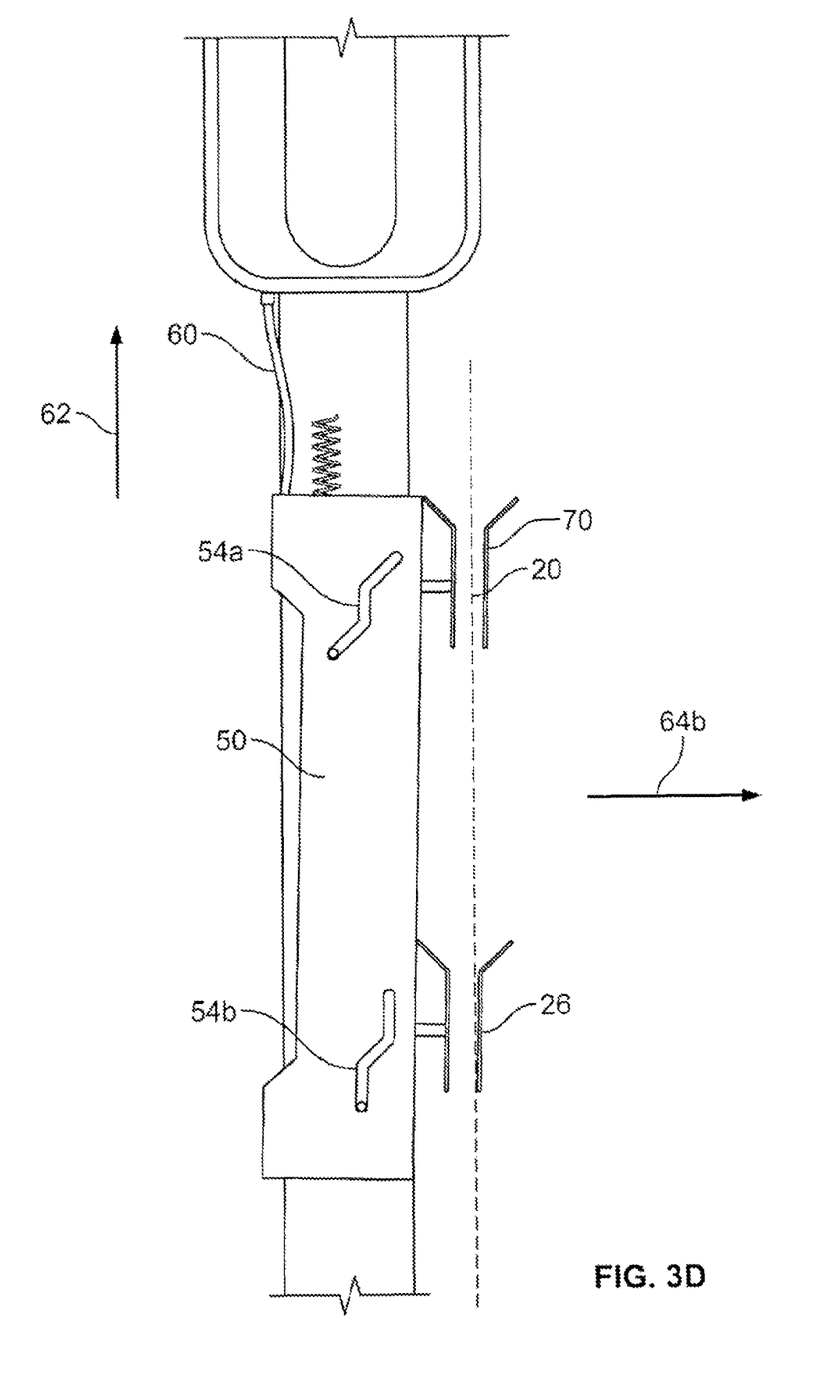

Referring to FIG. 3D when the base plate is moved in a direction shown as 62, the front portion of the base plate moves in a direction shown as 64b. This causes the chain to also move in the pedal sprocket nest in direction 64b causing the chain to move to another sprocket in the pedal sprocket nest. The rear pin simply travels in a path parallel to the long axis of the frame and does not cause the chain to move to another sprocket in the drive sprocket nest. Therefore, the chain can be moved from sprocket to sprocket in the pedal nest and the drive nest with a single derailleur.

Figure 5:
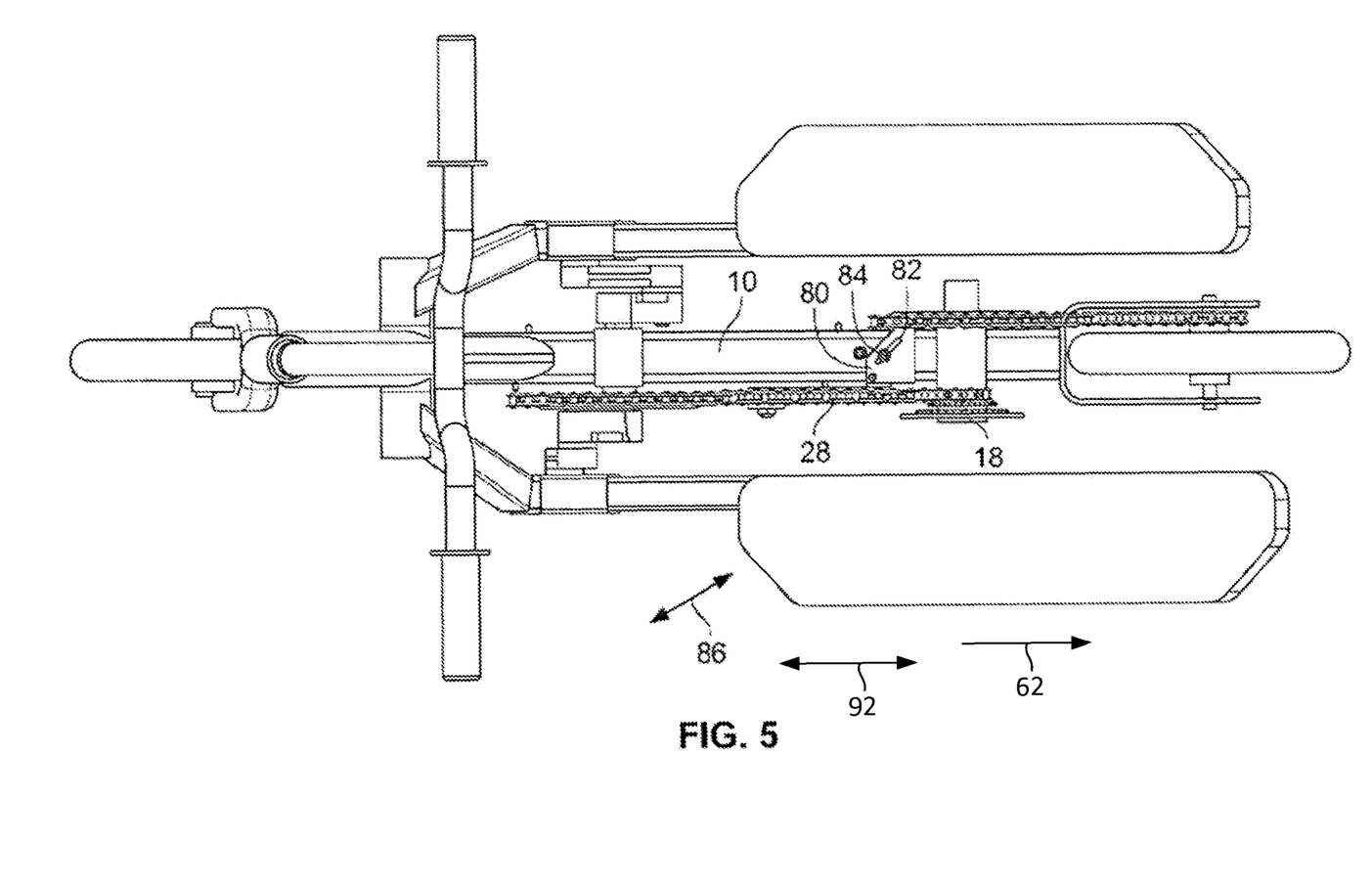
FIG. 5 is a top perspective view of the invention.

Referring to FIG. 5, the chain guide includes a contact surface 70 that forces the chain upwards causing the chain to contact over ½ the perimeter of the drive sprocket. Because the chain contacts more than ½ of the perimeter of the pedal sprocket when there is a pedal sprocket nest, the diameter between sprockets can be increased over traditional increments. In one embodiment, the differential between pedal diameters from one pedal sprocket to another is increased by thirty percent over traditional sprocket nests.

The derailleur can be disposed between the perimeter of the largest sprocket of the drive sprocket and the perimeter of the pedal sprocket. In one embodiment, a pedal sprocket nest is carried by the frame and the derailleur is disposed between the largest sprocket of the drive sprocket nest and the largest sprocket of the pedal sprocket nest.

The top plate 80 is attached to the derailleur and carried by the base plate. A top slot 82 is defined in the derailleur and receives pin 84 which is carried by the frame. When the derailleur is moved in a direction shown as 92, the pin and top slot cooperate to move the chain guide laterally in a direction shown as 86 causing the chain to move from one sprocket to another in the drive sprocket nest.

One embodiment of the invention as described herein, is directed to a scooter; as used herein, a scooter is a vehicle having typically two wheels, but could have three, but is so designed to have the rider standing on the pedals. The use of pneumatic tires, solid rubber or urethane tires, does not change the device from a scooter to a bicycle. It is understood, however, the present invention with the addition of a seat for the rider, would take on the appearance of a pedal drive bicycle, as such the use of the present invention with a seat would also be considered within the scope of the present invention, but it must be appreciated that the maximum driving speed of the rear wheel is most easily performed standing. The vehicle can be motorized or non-motorized Variations in the present invention are possible in light of the description provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fully intended scope of the invention as defined by the following appended claims.

What is claimed is:

1. A self-powered non-motorized vehicle having a frame, a steerable front wheel carried by the frame, and a rear wheel carried by the frame, the rear wheel linked to a drive axle carried by the frame, comprising:
   a drive sprocket nest attached to the rear wheel so that when rotational force is applied to the drive sprocket nest the rear wheel rotates causing locomotion;
   a pedal sprocket carried by the frame and linked to the drive sprocket nest by a chain so that when a rotational force is applied to the pedal sprocket, the pedal sprocket rotates causing the drive sprocket nest to rotate;
   a derailleur carried by the frame and positioned forward of the drive sprocket nest and rearward of the pedal sprocket;
   a chain guide that when the derailleur is moved laterally to a long axis of the frame, the chain moves between sprockets on the drive sprocket nest;
   a base plate included in the derailleur, wherein the base plate has a first slot and a second slot, wherein the second slot is generally a "Z" configuration; and,
   a first in received in the first slot for guiding the base plate along a first path and a second pin received in the second slot for guiding the base plate along a second path.

2. The vehicle of claim 1 wherein the chain guide includes a chain guide surface which causes the chain to contact over ½ a perimeter of a sprocket of the drive sprocket nest when the chain is engaged with the sprocket of the drive sprocket nest.

3. The vehicle of claim 1 including a tension member carried by the frame causing the chain to contact over ½ a perimeter of the pedal sprocket decreasing the likelihood of the chain slipping off the pedal sprocket.

4. The vehicle of claim 1 wherein the derailleur is disposed in a shifting area.

5. The vehicle of claim 4 wherein the shifting area is defined by a line vertically intersecting a forward most perimeter of a largest sprocket of the drive sprocket nest, a line connecting generally a top perimeter of the pedal sprocket and the largest sprocket of the drive sprocket nest, a line vertically intersecting the pedal sprocket and a line connecting generally a bottom perimeter of the pedal sprocket and the largest sprocket of the drive sprocket nest.

6. The vehicle of claim 1 wherein the first slot is generally a "Z" configuration.

7. The vehicle of claim 6 wherein the first slot and the second slot are offset about 45 degrees.

8. The vehicle of claim 1 wherein the derailleur is disposed forward of a perimeter of a largest sprocket of the drive sprocket nest and rearward of a pedal sprocket perimeter.

9. The vehicle of claim 1 the pedal sprocket is contained within a pedal sprocket nest and the pedal sprocket nest is carried by the frame so that when the derailleur moves in a lateral direction in relation to the long axis of the frame, the chain moves from one sprocket to another within the pedal sprocket nest.

10. A derailleur used with a vehicle where the vehicle includes a frame, a front steerable wheel carried by the frame, a pedal sprocket carried by the frame, a rear wheel carried by the frame, a drive axle carried by the frame, a drive sprocket nest carried by the frame and connected to the rear wheel, a chain linking the pedal sprocket to the drive sprocket nest comprising:
   a base plate having a first slot for receiving a first pin carried by the frame causing a portion of the base plate to travel along a first path corresponding to the first slot;
   a second slot for receiving a second pin carried by the frame causing a portion of the base plate to travel along a second path corresponding to the second slot, wherein the second slot is generally a "Z" configuration and when the base plate travels along the second path corresponding to the second slot, the base plate moves laterally in relation to a long axis of the frame; and,
   a chain guide attached to the base plate for causing the chain to move laterally in relation to the long axis of the frame when the base plate travels along a first path, thereby causing the chain to move from one sprocket in the drive sprocket nest to another sprocket in the drive sprocket nest.

11. The derailleur of claim 10 including a chain guide surface included in the chain guide causing the chain to contact over ½ a perimeter of a sprocket of the drive sprocket nest when the chain is engaged with the sprocket.

12. The derailleur of claim 10 including a pedal sprocket nest carried by the frame wherein the chain guide causes the chain to move from one sprocket to another within the pedal sprocket nest when the base plate moves laterally in relation to the long axis of the frame.

13. The derailleur of claim 10 including a second chain guide for guiding the chain from sprocket to sprocket within the pedal sprocket nest.

14. The derailleur of claim 10 including a tension member carried by the frame causing the chain to contact over ½ a perimeter of the pedal sprocket decreasing the likelihood of the chain slipping off the sprocket.

15. The derailleur of claim 10 wherein the derailleur is disposed between a perimeter of a largest sprocket of the drive sprocket nest and a perimeter of the pedal sprocket.

16. The derailleur of claim 10 including a top plate carried by the base plate having a top slot for receiving a top pin carried by the frame causing the top plate to travel along a path corresponding with the top slot.

17. A derailleur comprising:
   a base plate disposed between a perimeter of a drive sprocket nest and a pedal sprocket;
   a chain guide attached to the base plate for moving a chain laterally causing the chain to move from sprocket to sprocket within a pedal sprocket nest;
   a chain guide surface included in the chain guide for causing the chain to contact over ½ a perimeter of the pedal sprocket decreasing the likelihood of the chain slipping off the pedal sprocket;
   a tension member attached to the base plate for removing slack in the chain as the chain moves from a larger sprocket to a smaller sprocket within the pedal sprocket nest; and,
   a first "Z" slot defined in the base plate so that when the base plate moves toward the pedal sprocket, the chain guide moves laterally causing the chain to move from sprocket to sprocket within the drive sprocket nest.

18. The derailleur of claim 17 including a second "Z" slot defined in the base plate so that when the base plate moves away the drive sprocket nest and toward the pedal sprocket, the chain guide moves laterally causing the chain to move from sprocket to sprocket within a pedal sprocket nest.

19. The derailleur of claim 18 wherein the first and the second slot are offset about 45 degrees allowing the base plate to move the chain from sprocket to sprocket within the pedal sprocket nest and the drive sprocket nest independently.

* * * * *